Nov. 20, 1956     C. F. OSBERG ET AL     2,771,533
WASTE DISPOSAL DEVICE

Filed Sept. 3, 1953     4 Sheets—Sheet 1

CHESTER F. OSBERG &
CLIFFORD B. COOPER
INVENTORS

BY
ATTORNEY

CHESTER F. OSBERG &
CLIFFORD B. COOPER
INVENTORS

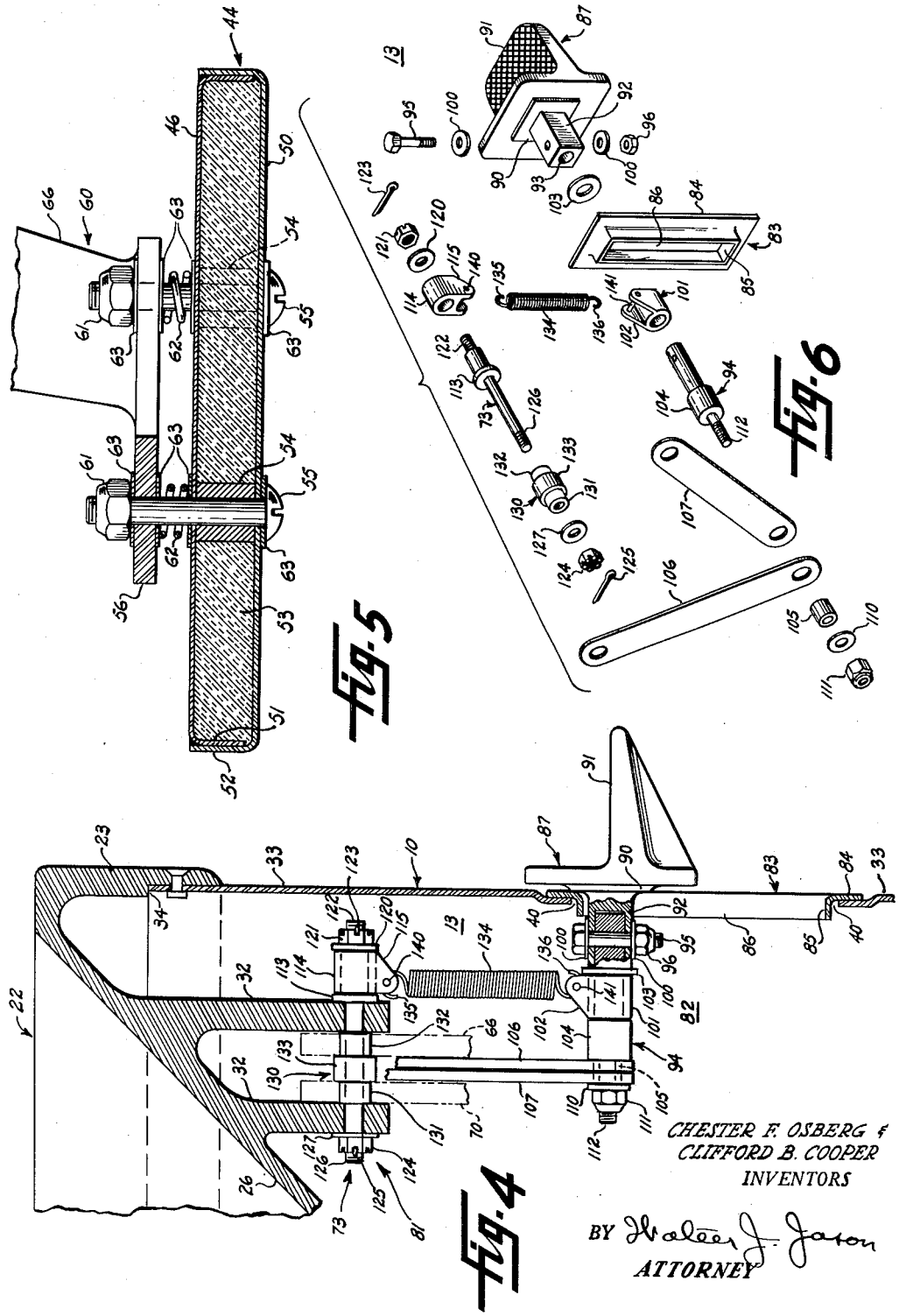

Nov. 20, 1956

C. F. OSBERG ET AL 2,771,533

WASTE DISPOSAL DEVICE

Filed Sept. 3, 1953

CHESTER F. OSBERG &
CLIFFORD B. COOPER
INVENTORS

BY
ATTORNEY

United States Patent Office 2,771,533
Patented Nov. 20, 1956

2,771,533

WASTE DISPOSAL DEVICE

Chester F. Osberg, San Diego, Calif., and Clifford B. Cooper, Fort Worth, Tex., assignors, by mesne assignments, to General Dynamics Corporation, a corporation of Delaware Application September 3, 1953, Serial No. 378,362

17 Claims. (Cl. 219—19)

This invention relates to an improved device for disposing of waste, sewage, or refuse, and more particularly, to a waste disposal device which is of the incinerator type and which is adapted for use in aircraft.

In contemporary aircraft, waste is usually flushed or emptied into containers where it is treated with deodorants, disinfectants, and various chemical agents to render it substantially odorless and bacteriologically harmless, the containers being emptied during ground servicing of the aircraft. In this method of disposing of sewage it is readily apparent that the waste, the containers for the waste, the flushing water, and the storage tanks for the flushing water impose a highly undesirable weight burden on the aircraft, and in addition, the containers and tanks require relatively large and valuable storage space aboard the aircraft.

In accordance with the present invention, there is provided a waste disposal device comprising, generally, two receptacles. The first, or deposit, receptacle is adapted for receiving waste, and the second, or incineration, receptacle is adapted for the immediate incineration or calcination of the waste with electrical resistance units being used to provide the heat necessary for this purpose. The disposal device is sufficiently insulated to reduce heat losses and to maintain the outer surfaces of the device at a temperature low enough to prevent injury to users of the device.

The transfer of waste from the deposit receptacle to the incineration receptacle may be accomplished manually, such transfer being essentially mechanical in nature whereby flushing water is unnecessary. Since flushing water is not required the need for flushing water storage tanks is obviated.

The present incineration receptacle is provided with adequate ventilation to secure satisfactory combustion, the resulting products of calcination being carried off and dissipated in the outer atmosphere in the form of gases and fine particles of ash. Thus, there is no necessity for waste storage containers.

The device is comparatively compact and light in weight, and is well adapted for use as a toilet stool. Further, the construction contemplated and employed adapts the present device for quick assembly and disassembly for such cleaning and maintenance as may be necessary.

It is, therefore, one of the principal objects of this invention to provide a waste disposal device of improved construction which affords complete and immediate disposal of waste, sewage, or refuse.

Another object of the invention is to provide an aircraft waste disposal device of improved form adapted for calcining waste through the utilization of heat derived from electrical heating units.

Another object of the invention is to provide an improved waste disposal device embodying novel apparatus for transferring waste without liquid flushing from a deposit receptacle to an incineration receptacle.

Still another object of the invention is to provide a waste disposal device of improved construction for incineration of toilet waste matter collected in an aircraft during flight, and for dissipation of the products of incineration into the atmosphere in finely divided particles or ash.

A further object of this invention is to provide for an aircraft an improved waste disposal device which will effect immediate decomposition and disposal of waste by calcining such waste and dissipating the products of calcination into the atmosphere in a substantially sterile and bacteriologically harmless condition.

A still further object of the invention is to provide a waste disposal device of improved construction which is comparatively light in weight, compact, and capable of easy disassembly for such maintenance and cleaning as may be necessary.

Other objects and features of the present invention will be readily apparent to those skilled in the art from the following specification and appended drawings wherein is illustrated a preferred form of the invention, and in which:

Fig. 4 is a fragmentary view, partially in section, of the pedal assembly taken along line IV—IV of Fig. 1, and including the outer pedal member;

Fig. 5 is a fragmentary, sectional view of an attachment between portions of the transfer mechanism;

Fig. 6 is an exploded perspective view of the pedal assembly;

Figure 1:
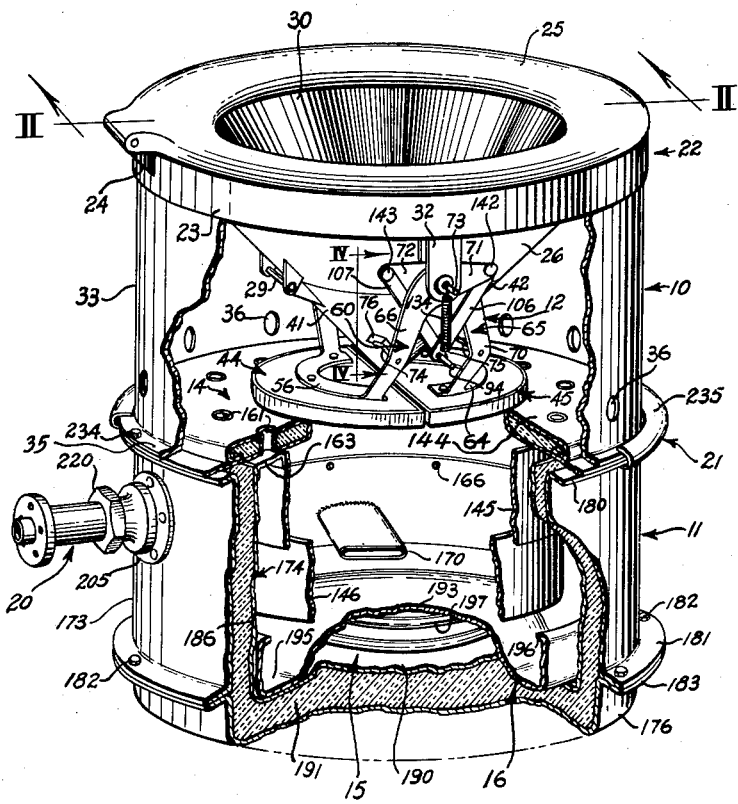
Fig. 1 is a perspective view of a preferred embodiment of a waste disposal device according to the invention with portions, including the outer parts of the pedal assembly, being cut away for clarity.
Figure 2:
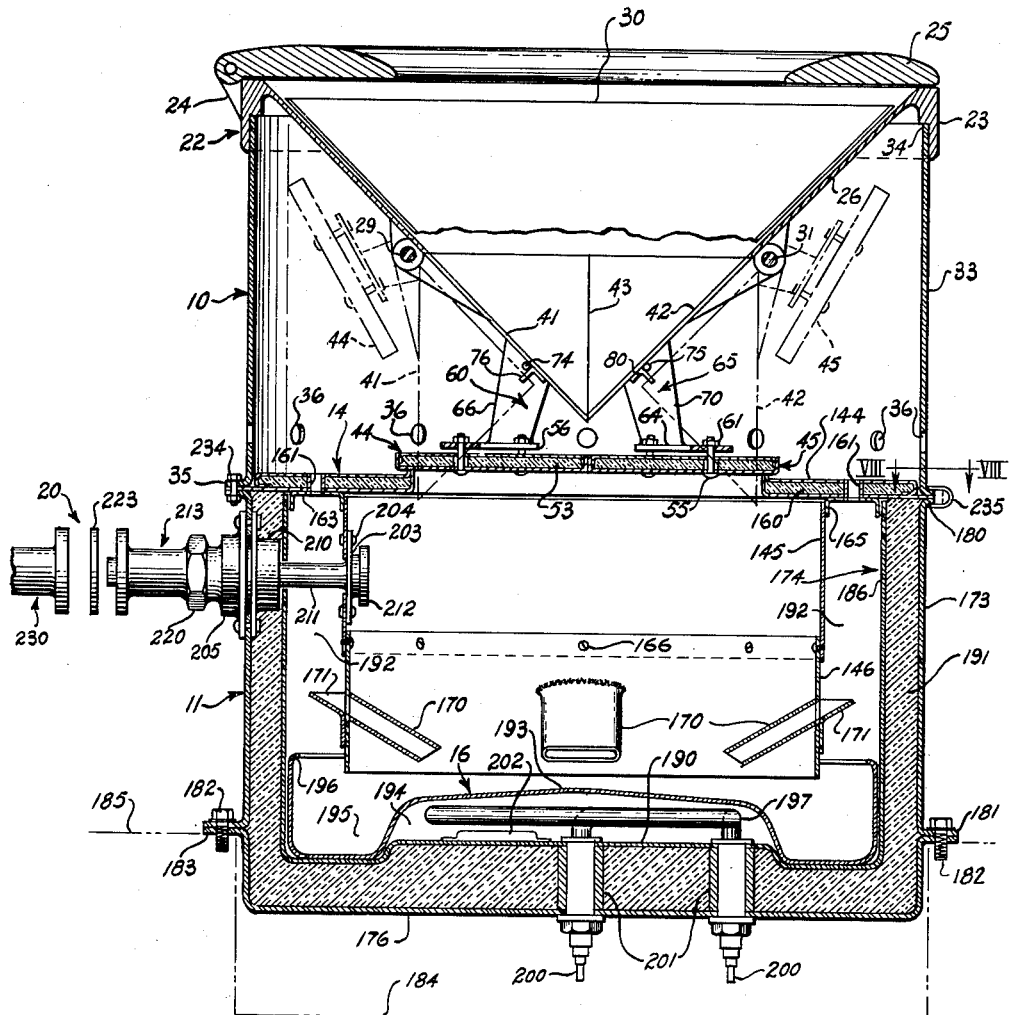
Fig. 2 is a sectional view taken along line II—II of Fig. 1.

Reference now will be had in detail to the drawings and in particular to Figs. 1 and 2, wherein an embodiment of the waste disposal device in accordance with the present invention is shown. The present waste disposal device comprises generally an upper assembly 10, a lower assembly 11, a transfer means or mechanism 12 which causes or permits the transfer of waste from assembly 10 to assembly 11, a pedal assembly 13 for actuating transfer mechanism 12, an annular baffle assembly 14 located superjacent and within assembly 11, a heating means or unit 15 for calcining the waste within assembly 11, a pan 16 fitted over unit 15 for collecting incompletely calcined waste, an exhaust system 20 which serves to carry away the ash and other products of calcination, and a clamp assembly 21 for securing together assemblies 10, 11 and 14.

Upper assembly 10 comprises an annular casting 22 embodying a downwardly depending peripheral flange 23 which is provided at its left side, as viewed in Figure 2, with an integral hinge 24 to which a conventional toilet seat 25 may be pivotally mounted when it is desired to use the disposal device as a toilet stool. Formed integral with casting 22 and extending downwardly and inwardly from flange 23 is a hollow, open-ended, truncated right circular cone or upper receptacle 26, the upper open end of which serves to admit the waste. A disposable receiving means such as a paper bag or cone 30 formed to the shape of receptacle 26 is preferably inserted therein prior to each use of the disposal device and receives the waste.

A pair of hinges 29 and 31 are provided, as best shown in Fig. 2, adjacent the lower edge of receptacle 26 at the left and right sides thereof, respectively, for pivotally supporting portions of transfer mechanism 12, which mechanism 12 transfers the waste from receptacle 26 to the incinerating area, as will be described more particularly hereinafter. Likewise, two pairs of integral support members or arms 32 are located at the front and rear sides, respectively, of receptacle 26, as viewed in Fig. 1, to thereby provide pivotal support for other (to be described) portions of transfer mechanism 12, only the front pair of arms 32 being illustrated in the drawings.

A cylindrical sheet metal shell 33, positioned concentric with casting 22 and forming a support therefor, is rigidly secured, as by rivets, at its upper edge to flange 23, of casting 22, shell 33 being seated within an internal, stepped seat or recess 34 in flange 23, as seen in Figure 2. The lower edge of shell 33 is provided with an outwardly directed flange 35 which rests upon the rim of baffle assembly 14, shell 33 thereby serving to support upper assembly 10 above baffle assembly 14 and the lower assembly 11.

The lower portion of shell 33 embodies a plurality of spaced holes 36 around its periphery to permit the passage of circulating or supply air into the interior of upper assembly 10, such air, as will be further explained, providing oxygen for the waste incineration. Now, referring briefly to Fig. 4, it will be seen that the wall of shell 33 is provided with a rectangular aperture 40, the defining edges of which are inwardly dished or displaced so as to effect a suitable seat for a portion of pedal assembly 13, as will be subsequently set forth.

Returning now to the structure shown in Figs. 1 and 2, transfer mechanism 12, which serves to effect transfer of waste from upper receptacle 26 to lower assembly 11, will next be described. Mechanism 12, as shown, comprises a pair of opposed upper gates or doors 41 and 42, which are normally located concentrically with truncated receptacle 26 and lie in abutment with the lower edge thereof, doors 41 and 42 being pivotally supported thereon by hinges 31. In their normally closed position, doors 41 and 42 abut at their inner edges, as at 43, Fig. 2, to form a hollow conical extension of receptacle 26, the doors constituting left and right halves, respectively, of such extension. Doors 41 and 42, when closed are thus adapted by their location and arrangement to serve as a holder or support for disposable paper cone 30, and further, by virtue of their weight and the location of hinges 32, doors 41 and 42 are adapted to pivot downwardly and outwardly about hinges 32 into an open position, as indicated by the broken lines in Fig. 2, whereby cone 30 and the waste therein is permitted to fall or pass from upper receptacle 26 downwardly between the doors 41 and 42. Restraining means for normally maintaining the doors in their closed position will hereinafter be described in conjunction with a second pair of doors 44 and 45 afforded by the present device.

Doors 44 and 45 are of semi-circular shape and normally are diametrically abutting. As shown, doors 44 and 45 are located in alignment with and beneath upper doors 41 and 42, respectively, and above annular baffle assembly 14, whereby in their closed position they serve to cover the central opening formed by the annular shape of baffle assembly 14. On movement of doors 44 and 45 to their open position, indicated by the broken lines in Fig. 2, waste will be permitted to fall through the opening provided.

Doors 44 and 45 are alike in construction and therefore only door 44 will be described in detail. Door 44, as best seen in Fig. 5, comprises a pair of semi-circular sheet metal pans 46 and 50 positioned in spaced and concentric relation with each other with upper pan 46 being provided with a continuous, downwardly disposed peripheral flange 51, which is fitted within and secured, preferably by welding, to a continuous upwardly disposed peripheral flange 52 afforded by pan 50. Within the space enclosed by pans 46 and 50, and flanges 51 and 52, is disposed any suitable high temperature resistant insulating material 53 thereby to insulate upper assembly 10 from such heat as may be generated within lower assembly 11.

A plurality of vertically disposed cylindrical spacers 54, three in number in the present embodiment, are associated with door 44, spacers 54 being uniformly spaced and rigidly secured between pans 46 and 50 thereby to fixedly maintain the pans in spaced relation. In addition, spacers 54 serve as bushings or holders for the shank portions of an equal number of machine screws 55, respectively, which are slidably disposed through and project upwardly of spacers 54. Screws 55, in turn, serve to connect lower door 44 to a semicircular plate 56.

Plate 56 is horizontally disposed above and concentric with door 44, and forms the lower or base portion of a bell crank assembly 60, which, as will be shown, effects pivotal movement of door 44. A plurality of locknuts 61, located adjacent plate 56, are mounted upon screws 55 to thereby secure the connections between plate 56 and door 44.

A plurality of compression springs 62, concentrically disposed about screws 55 are located between plate 56 and door 44 thereby to resiliently maintain door 44 in spaced relation with plate 56 whereby door 44 will fit tightly against baffle assembly 14, as will be further described. In addition, a plurality of annular washers 63, usually four for each screw 55, are mounted on screws 55, as seen, to provide bearing surfaces for screws 55, springs 62, and locknuts 61.

Door 45 in its construction is identical in all respects to door 44, and is associated with a base plate 64 of a second bell crank assembly 65, also identical in construction to previously mentioned base plate 56 and assembly 60, respectively, associated with door 44. As to location, door 45 is positioned opposite door 44 and is connected to its base plate 64 by screws 55, springs 62, and washers 63, similar to the manner in which door 44 is connected to plate 56. As illustrated, plate 64 is horizontally disposed concentric with door 45, but in a direction opposite to that of plate 56 of door 44.

Bell crank assemblies 60 and 65 cooperate with lower doors 44 and 45, respectively, to effect outward and upward pivotal movement of the doors to thereby allow cone 30 and the waste therein to pass between the doors. In addition, assemblies 60 and 65 each embody a pair of integral bell cranks 66 and 70, respectively, which extend upwardly from the ends of their base plates 56 and 64, respectively, as viewed in Figs. 1 and 2, bell cranks 66 terminating in substantially horizontally disposed arms 71, and cranks 70 terminating in similar but oppositely disposed arms 72.

As will be noted, the pair of bell cranks 66 are positioned, horizontally spaced apart and on opposite sides of receptacle 26, and the pair of bell cranks 70 are similarly located on opposite sides of receptacle 26 whereby a bell crank 66 and a bell crank 70 are positioned adjacent and oppositely disposed to each other on each side of receptacle 26. The adjacent pairs of bell cranks 66 and 70 are pivotally attached at their fulcrum or apex portions to upper assembly 10 at the two pairs of downwardly depending support arms 32, respectively, by suitable support rods disposed through appropriate openings in arms 32 and bell cranks 66 and 70. The support rod for the pair of bell cranks 66 and 70 located on the far side of receptacle 26 may comprise, for example, a conventional bolt and cotter-keyed nut assembly, not shown, while the support rod for the other, or forward, pair of cranks 66 and 70 comprises, as shown in Fig. 1, an upper pivot rod 73, which will be hereinafter described in greater detail in connection with pedal assembly 13.

It is seen that each of the pair of arms 71 of bell cranks 66 associated with door 44 is adjacent with but disposed in a direction opposite to the arms 72 of bell cranks 70 associated with the other door 45, whereby the application of a downward force by pedal assembly 13, in a manner to be shown, on the ends of the pair of adjacent and opposing bell crank arms 71 and 72 on the forward side of receptacle 26 will effect an outward and upward pivotal movement of doors 44 and 45 away from each other about a pivotal axis through rod 73 until doors 44 and 45 reach their open position. In this open position, and when upper doors 41 and 42 are also in their open position, the disposable cone 30 and the waste therein are permitted to fall or pass from receptacle 26, between the open upper doors 41 and 42, through lower doors 44 and 45, then through the exposed annular opening in baffle assembly 14, and finally into lower assembly 11.

In the absence of any externally applied downward force on arms 71 and 72, lower doors 44 and 45 are urged into their normally closed position by the force of gravity and by the force of spring means (to be described) embodied in pedal assembly 13.

During the closing movement of lower doors 44 and 45, a pair of control rods 74 and 75, cooperating with a pair of generally L-shaped bracket member 76 and 80, respectively, simultaneously effect the closure of upper doors 41 and 42. Rods 74 and 75, as shown in Figs. 1 and 2, are fixedly attached to, and inwardly directed from, that pair of bell cranks 66 and 70, respectively, which are located on the forward side of receptacle 26. Brackets 76 and 80 are rigidly secured to upper doors 41 and 42, respectively, in a position whereby when bell cranks 66 and 70 are actuated to cause lower doors 44 and 45 to pivot downwardly and inwardly, rod 74 of bell crank 66 will operatively engage and push upon bracket 76 of door 41 and, similarly, rod 75 of bell crank 70 will operatively engage and push bracket 80 of door 42 to thereby urge upper doors 41 and 42 into a closed position. When lower doors 44 and 45 occupy their closed position, rods 74 and 75 will be seated upon brackets 76 and 80, respectively, to provide the previously mentioned restraining means for normally preventing upper doors 41 and 42 from falling open. On the other hand, when lower doors 44 and 45 are moved by bell cranks 66 and 70 into their open position, the restraint offered by rods 74 and 75 is removed with the result that upper doors 41 and 42 are allowed to fall open. Thus, waste deposited in upper receptacle 26 is normally retained therein by upper doors 41 and 42, when these doors are maintained in their closed position by the action of control rods 74 and 75 against brackets 76 and 80, respectively, lower doors 44 and 45 at the same time being in their normally closed position.

In summation, the application of a downward force against arms 71 and 72 of bell crank assemblies 60 and 65, respectively, effects a pivotal movement of assemblies 60 and 65, and, in turn, pivotal outward movement of lower doors 44 and 45. As lower doors 44 and 45 pivot open, the restraint of control rods 74 and 75 against brackets 76 and 80, respectively, is removed whereby upper doors 41 and 42 are permitted to fall or pivot open by virtue of their own weight in addition to the weight of the waste retained by the doors. Consequently, the waste is permitted to fall through open doors 41 and 42, open doors 44 and 45, through baffle assembly 14, and into lower assembly 11.

Reversely, removal of the downward force against arms 71 and 72 permits lower doors 44 and 45 to pivot downwardly of their own weight, and also by virtue of the action of elements of the pedal assembly 13, as will be shown, into a closed position. As previously described, rods 74 and 75 acting against brackets 76 and 80, simultaneously effect the closure of upper doors 41 and 42, respectively, whereby the disposal device is again ready for use.

Figure 3:
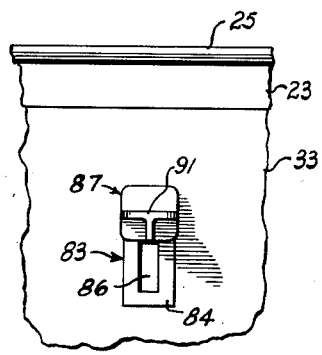
Fig. 3 is a fragmentary view of the disposal device of Fig. 1 showing the pedal member.

The actuation of pedal assembly 13, in addition to its function of opening and closing lower doors 44 and 45, also aids in normally maintaining lower doors 44 and 45 in their closed position, as will be described. Assembly 13 is preferably located on the front side of receptacle 26, and, as illustrated in Figs. 3, 4, and 6 includes upper and lower portions 81 and 82, respectively.

Lower portion 82 includes a rectangular frame 83 which is fitted within aperture 40 of shell 33. Frame 83 is provided with an outer flange 84, rigidly secured by any suitable means to shell 33, and an inwardly disposed flange 85 which defines a central rectangular opening 86 in frame 83.

A foot pedal, generally designated 87, is positioned through opening 86, and is adapted for vertical sliding movement therewithin, pedal 87 including a shoulder portion 90 which is located in contacting slidable relation with the outer face of flanges 84 of frame 83. In addition, pedal 87 includes an integral pedal member 91, located outwardly of shoulder portion 90, member 91 being characterized by a step portion, as illustrated, to permit an operator of the disposal device to effect ready depression of foot pedal 87.

Pedal 87 also includes an axially disposed square protuberance 92, which is located inwardly of shoulder portion 90 and which projects inwardly through opening 86 into shell 33. Protuberance 92 is of slightly lesser width than opening 86, being thereby adapted for vertical sliding movement within opening 86, with the square shape of protuberance 92 serving to prevent rotation thereof during such movement.

Protuberance 92 is provided with a centrally located axial opening 93 within which is fitted the outer end of a lower pivot rod 94, rod 94 being rigidly secured therein by a bolt 95 which is disposed through vertically aligned holes provided in protuberance 92 and rod 94. Associated with bolt 95 are a locknut 96 for securement of the bolt, and also a pair of washers 100, as illustrated for improved bearing support for bolt 95 and locknut 96.

A cylindrical bushing or lower collar 101, embodying a pair of upwardly disposed ears or tabs 102, is concentrically and pivotally mounted upon rod 94 inwardly of protuberance 92, collar 101 being spaced from protuberance 92 by an annular washer 103 which serves to prevent binding or galling between cylindrical collar 101 and square protuberance 92 during pivotal movement of collar 101.

A greater diameter shoulder portion 104 of lower pivot rod 94 is located adjacent collar 101 and serves to space collar 101 from a cylindrical bushing 105 which is located inwardly with respect to portion 104 and is rotatably carried by rod 94. Fitted upon bushing 105 are the lower ends of a pair of adjacent connecting links 106 and 107 whereby the links may have pivotal movement about pivot rod 94. An annular washer 110 is mounted upon rod 94 in abutment with the inner end of bushing 105, and serves to prevent binding or galling action between bushing 105 and a locknut 111 which is secured inwardly of bushing 105 to a threaded end portion 112 of rod 94. In addition, in order to permit freedom of movement between bushing 105 and pivot rod 94, locknut 111 is tightened in loose, rather than snug, abutment with washer 110.

The upper portion 81 of pedal assembly 13 includes upper pivot rod 73, which is supported by the pair of arms 32 located on the front side of receptacle 26, as was previously described. Rod 73 embodies a shoulder portion 113 which abuts against the outward support arm 32, portion 113 serving to space an upper collar 114, which is rotatably mounted on rod 73, from the support arm 32 and further serving to prevent binding therebetween. Upper collar 114 is identical in construction to lower collar 101 of the lower portion of pedal assembly 13, and similarly embodies a pair of ears or tabs, indicated by the numeral 115, tabs 115 projecting downwardly in vertical alignment with tabs 102 of lower collar 101.

An annular washer 120, carried by rod 73, is located outwardly of and adjacent with collar 114, washer 120 serving to prevent binding between collar 114 and a castellated nut 121 which is mounted on a threaded outer end portion 122 of rod 73. Nut 121 is tightened in loose, rather than snug, abutment with washer 120, and is secured in this position by a cotter pin 123 disposed through suitably aligned openings in nut 121 and rod 73 in the conventional manner. Similarly, at the inner end of rod 73 a washer 127 is located in abutment with the inner side of inward support arm 32, washer 127 serving to prevent binding between arm 32 and a castellated nut 124, which is secured by a cotter pin 125 to threaded end portion 126 of rod 73, all in a manner substantially identical to the mounting of washer 120, nut 121, and pin 123 upon end portion 122 of rod 73.

Located between arms 32 and rotatably carried by rod 73 is a cylindrical bushing 130 comprising two smaller diameter end portions 131 and 132 separated by a larger diameter intermediate portion 133, portions 131 and 132 serving to pivotally carry the outer pair of adjacent bell cranks 70 and 66, respectively, and portion 133 serving to maintain spaced relation between bell cranks 70 and 66.

Lower portion 92 of pedal assembly 13 is connected to upper portion 81 by a vertically disposed, relatively high tension spring 134 which embodies upper and lower hooks or tangs 135 and 136, respectively. Upper tang 135 is hooked about a pin 140 which is rigidly positioned through openings provided in tabs 115, and, similarly, lower tang 136 is hooked about a pin 141 which is rigidly positioned through openings provided in tabs 102. Tension spring 135 serves normally to maintain lower portion 82 in its upper position with the result that pedal 87 will normally be located within the upper portion of opening 86 of frame 83, and downward movement of pedal 87 will be against the bias of spring 134.

Links 106 and 107 extend upwardly from lower pivot rod 94 and have their upper ends pivotally connected to arms 71 and 72 of bell cranks 66 and 70, respectively, by a pair of bolts 142 and 143 (as shown in Fig. 1) whereby a downward movement of links 106 and 107 produces pivotal movement of bell cranks 66 and 70, respectively. In addition, it will be noted that the intermediate portion 133 of bushing 130 serves to space apart cranks 70 and 66 a distance sufficient to permit pivotal movement of links 106 and 107 between cranks 70 and 66, as best seen in Fig. 4. In order to permit similar pivotal movement of the links 106 and 107 which are located on the far side of the disposal device, between their corresponding cranks 66 and 70, a bushing (not shown) which is identical to bushing 130 is preferably mounted upon the previously mentioned support rod there located, but not shown.

Next will be described the operation of pedal assembly 13 and the consequent operation of transfer mechanism 12. Assembly 13 is actuated when the operator of the disposal device depresses pedal member 91. Movement of member 91 downwardly effects downward movement of lower pedal assembly portion 82 and thereby extends spring 134. Inasmuch as spring 134 is relatively strong, a substantial force is required to depress pedal member 91 whereby inadvertent or accidental depression thereof is difficult.

The downward movement of lower pedal assembly portion 82 forces a downward movement of links 106 and 107 thereby to exert a downward force on arms 71 and 72 of bell cranks 66 and 70 thereby simultaneously causing the bell cranks 66 and 70 to pivot outwardly and upwardly about portions 132 and 131, respectively, of bushing 130. As will be apparent, this pivotal movement of the bell cranks 66 and 70 effects a corresponding pivotal movement of lower doors 44 and 45 respectively, whereby these doors simultaneously move to their open position. As previously described, the opening of lower doors 44 and 45 disengages rods 74 and 75 from brackets 76 and 80, respectively, to thereby allow upper doors 41 and 42 to pivot downwardly and outwardly about corresponding hinges 29 and 31 and into their open position. In this manner, cone 30 and the waste therein is permitted to pass into lower assembly 11.

Upon release of pressure from pedal member 91, spring 134 contracts to urge lower portion 82 of pedal assembly 13 upwardly which, in turn, provides a force, through links 106 and 107, upwardly against arms 71 and 72 of bell cranks 66 and 70 respectively. As will be evident, this upward force acts through bell cranks 66 and 70 to be applied against lower doors 44 and 45. This force added to the weight of the lower doors 44 and 45 causes these doors to pivot downwardly and inwardly into a closed position. In this operation rods 74 and 75 carried by bell cranks 66 and 70 move into engagement with brackets 76 and 80, respectively, to thereby urge upper doors 41 and 42, respectively, into a closed position. It is to be noted that the force provided by spring 134 is sufficient to urge doors 44 and 45 into firm abutting contact with each other. In this completely closed position, the plurality of springs 62 (see Fig. 5) associated with doors 44 and 45 are compressed, forcing doors 44 and 45 against baffle assembly 14 to thereby provide firm and substantially continuous contact between the doors and the abutting portions of assembly 14 whereby the escape of such heat and gases as may be generated within lower assembly 11 is substantially prevented. This resilient connection is also advantageous in that any slight misalignment of the abutting components, or slight tilting thereof, is compensated for by the action of springs 62.

The force necessary for compressing the plurality of springs 62 is provided by the weight of doors 44 and 45 and also, as described, by the force exerted by spring 134 of pedal assembly 13.

Figure 7:
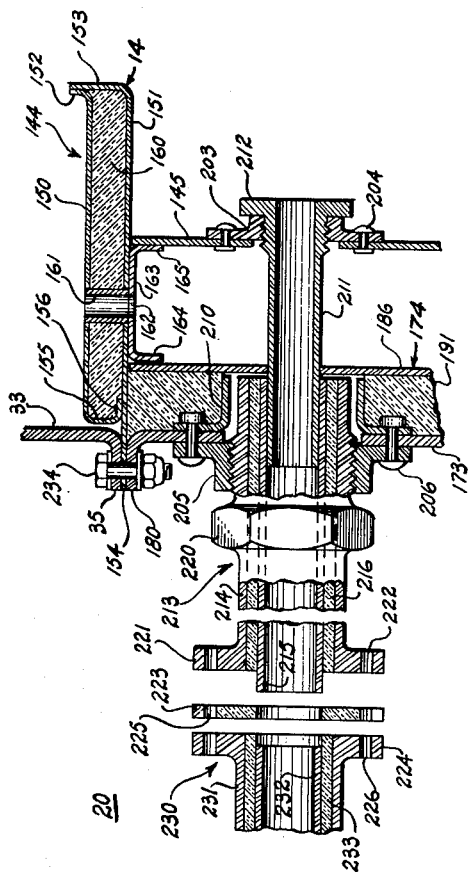
Fig. 7 is a fragmentary, sectional view of a portion of the exhaust system.

Referring now to Figs. 1, 2, and 7, it is seen that baffle assembly 14, which guides and directs the flow of supply air from upper assembly 10 to lower assembly 11, comprises an annular cover 144 located between upper and lower assemblies 10 and 11, a downwardly depending cylindrical upper baffle 145 carried by cover 144, and a downwardly depending cylindrical lower baffle 146 which, in turn, is carried by upper baffle 145. Baffles 145 and 146 extend within lower assembly 11, and are preferably made of sheet metal to withstand the comparatively high temperatures encountered during operation of the disposal device. Elements of exhaust system 20 are secured to the left portion (as viewed in Fig. 2) of upper baffle 145, as will be subsequently described in connection with system 20.

As best seen in Fig. 7, cover 144 comprises a pair of aligned sheet metal annular components 150 and 151 located in vertical spaced relation, upper component 150 embodying an upwardly extending inner peripheral flange 152, and lower component 151 embodying a similar inner peripheral flange 153 which extends upwardly and abuts with flange 152, flanges 152 and 153 being rigidly secured together, as by spot welding. The upper edges of flanges 152 and 153 form a seat for lower doors 44 and 45 in their normally closed position, and for this reason such edges should be substantially circumferentially level.

Lower component 151 of cover 144 embodies an outer rim or edge portion 154 which fits in subjacent abutting relation with flange 35 of upper assembly 10 and is adapted to connection thereto. Upper component 150 of cover 144 embodies a downwardly depending outer peripheral flange 155, the end margins of which form an inwardly extending flange 156 which is secured, as by welding, to lower component 151.

Any suitable high temperature resistant insulating material 160 is disposed within the space formed by components 150 and 151, and flanges 155 and 153, thereby insulating upper assembly 10 from such heat as may be generated within lower assembly 11.

Cover 144 also embodies a plurality of uniformly spaced and circumferentially disposed cylindrical vent members 161, which are rigidly secured, as by welding, within suitable openings provided in the components 150 and 151, members 161 thereby serving as a conduit for the flow of supply air to lower assembly 11.

An annular frame 163 is spot welded to the underside of cover 144 and is provided with a plurality of openings 162, one for each vent member 161, openings 162 being in substantial alignment with vent members 161 whereby supply air from members 161 is permitted to flow to lower assembly 11. In addition, the outer periphery of frame 163 embodies a downwardly depending flange 164 which aids in properly locating baffle assembly 14 with respect to lower assembly 11, as will be shown. The inner periphery of frame 163 embodies a similar, downwardly depending flange 165 to which is spot welded upper baffle 145. As shown in Fig. 2, lower baffle 146 is removably secured to the lower portion of upper baffle 145, as by a plurality of self-tapping metal screws 166, whereby lower baffle 146 may be easily and quickly removed for maintenance purposes.

As best seen in Fig. 2, a plurality of tubes 170, usually four in number, are inwardly and downwardly disposed through suitable, uniformly spaced openings provided in the periphery of lower baffle 146, tubes 170 being rigidly secured in this position, as by welding. Tubes 170 embody scoop-like upper end portions 171 which, by virtue of their shape, as illustrated, are adapted to trap a portion of the incoming supply air flowing downwardly therepast and convey this air through tubes 170 to the center portion of lower assembly 11, to thereby effect more complete waste incineration.

Lower assembly 11, as shown in Figs. 1 and 2, is located concentric with and below upper assembly 10, and comprises, generally, an open ended, cylindrical sheet metal outer shell 173 of substantially the same diameter as shell 33 of upper assembly 10, the lower end of shell 173 being closed by a base member 176. In addition, a sheet metal lower receptacle 174 is nested within outer shell 173 in concentric relation therewith and itself has the collector pan 16 fitted therewithin adjacent its base. Outer shell 173, it is seen, embodies an outwardly extending upper peripheral flange 180, and a similar lower peripheral flange 181. Upper flange 180 abuts and is adapted for connection with outer edge portion 154 of baffle assembly 14, while lower flange 181 abuts with and is rigidly connected, as by a plurality of bolts 182, to an outwardly extending upper peripheral flange 183 which is integral with base member 176.

Base member 176 is adapted to fit within a recess 184 in a floor or supporting surface 185, as indicated by the broken lines in Fig. 2, whereby a convenient method of locating the disposal device in the aircraft or other vehicle is provided. In this regard, bolts 182 may be adapted for threadable securement to appropriate fittings (not shown) associated with surface 185.

Lower receptacle 174, within which the waste matter is incinerated, comprises an inner cylindrical shell 186 located in spaced relation with outer shell 173, and further comprises an integral base portion 190, which is, in turn, located above and in spaced relation with base member 176. Collector pan 16 is adapted to rest upon the upper surface of base portion 190.

Within the space defined between shells 186 and 173, and between base portion 190 and base member 176, there is disposed any suitable high temperature resistant insulating material 191 to thereby reduce loss of such heat as may be generated within lower assembly 11. This heat is most intense at approximately the center of base portion 190, and for this reason, portion 190 is upwardly dished to accommodate a greater thickness of insulating material 191 between portion 190 and member 176.

As illustrated, the upper peripheral edge of inner shell 186 of receptacle 174 serves to aid in locating annular frame 163 of baffle assembly 14 in a position concentric with upper and lower assemblies 10 and 11 during assembly of the disposal device, flange 164 of frame 163 being positioned slightly inwardly of inner shell 186 in concentric relation with shell 186.

It can be seen that between receptacle 174 and baffles 145 and 146 of baffle assembly 14 there is formed an annular space 192, which at its upper portion communicates with the atmosphere outside the disposal device by way of the vents 161 and holes 36 in shell 33 of upper assembly 10. In addition, the lower portion of annular space 192 communicates with the inner lower portion of receptacle 174 through tubes 170 and also through the space afforded beneath lower baffle 146. Thus, there is provided a passageway for incoming air from the outside atmosphere to the lower portion of receptacle 174 to thereby promote incineration of waste matter therein.

Collector pan 16, which is contained within receptacle 174, is of generally dish-shape and is preferably made in one piece, as best illustrated in Fig. 2. This pan is of sufficiently smaller diameter than shell 174 that it may be readily removed when desired for periodic cleaning and emptying.

The center portion 193 of pan 16 is upwardly dished to thereby define with the raised portion of base portion 190 a space 194 within which is located a heating unit 15. In addition, this upwardly dished center portion 193 forms with the sides of the pan an annular trough 195. As will be evident, by virtue of the location of pan 16 excrement falling into lower assembly 11 will be deposited on portion 193 of pan 16 with liquid waste matter collecting in trough 195.

Calcination of such waste matter by heat from unit 15 is substantially complete but there may be a certain amount of uncalcined waste or ashes which may remain, this will be collected in trough 195 and emptied periodically during maintenance of the disposal device. To facilitate removal of pan 16, the side thereof is provided at its upper edge with an inwardly disposed flange 196 to provide a hand-hold for grasping pan 16 when assembly 11 is separated from assembly 10 and baffle assembly 14. Flange 196 also serves to strengthen pan 16 against warpage which may result from the high temperatures encountered during incineration of the waste.

Heating unit 15, as previously mentioned, is housed within space 194 and, as shown in Fig. 2, comprises usual circular electrical resistance coils 197 connected to a suitable electrical power source (not shown) through a pair of terminals 200.

Terminals 200 extend through suitable openings provided in base portion 190 of receptacle 174, insulating material 191, and base member 176, terminals 200 being insulated by a pair of spacers or bushings 201 which are rigidly mounted between portion 190 and member 176. In addition, bushings 201 serve to support receptacle 174 above base member 176.

A conventional thermoswitch 202 is also located within the space 194 provided between the base of pan 16 and the base of receptacle 174 and is connected in series with coils 197 and serves to cut off the electrical power to coils 197 whenever the temperature developed exceeds a preset maximum. Similarly, thermoswitch 202 will turn on the electrical power whenever the temperature within space 194 falls below a preset minimum. In addition, if desired, a usual timing device (not shown) may be incorporated in heating unit 15 to thereby cut off the electrical power to coils 197 after a specified or preset time interval has elapsed since the last usage of the disposal device. In this manner, an economy of power consumption may be achieved.

Exhaust system 20 which is associated with lower assembly 11 is provided to carry away the vapors and gases generated during incineration and evaporation of waste material. As best shown in Fig. 7, exhaust system 20 comprises a flanged, internally threaded collar 203 mounted to the inner surface of upper baffle 145 and rigidly secured thereto, as by a plurality of rivets 204, A flanged, internally threaded collar 205, similar to but larger than collar 203, is mounted in alignment with collar 203 to the outer surface of outer shell 173 and is rigidly secured thereto, as by a plurality of rivets 206. In addition, rivets 206 rigidly secure to the inner surface of shell 173 a flanged collar 210 whose inwardly disposed flange serves to define a circular passage through insulation 191. Associated with collar 203 is a removable pipe 211 which extends through collar 203, through aligned openings in baffle 145 and spaced shells 173 and 186, and through the passage defined by collar 210 to project its outer end slightly beyond shell 173. On its inwardly disposed end, pipe 211 is provided with a flange 212 which abuts collar 203 which serves as a stop when pipe 211 is inserted in collar 203. Further, pipe 211 is externally threaded adjacent flange 212 to permit engagement with the internally threaded collar 203 whereby pipe 211 is rigidly secured in position. Also, flange 212 may be made hexagonal in shape, that is, provided with flat surfaces, to thereby facilitate insertion and removal of pipe 211 with a wrench or the like.

A removable pipe assembly, generally designated 213, is inwardly disposed through collars 205 and 210, and comprises an outer pipe 214 and an inner pipe 215. Outer pipe 214 is externally threaded adjacent its inwardly disposed end to thereby engage with the internally threaded collar 205. Inner pipe 215 is concentrically located within pipe 214 and projects one end slightly outwardly of pipe 214. Located interjacent pipes 214 and 215 is a cylinder 216 which is composed of insulating material and is adhesively bonded to pipes 214 and 215 to thereby reduce the temperature of the external surfaces of pipe member 213.

As is shown, the inner diameter of pipe member 215 is greater than the outer diameter of pipe 211 to thereby enable the outwardly projecting portion of pipe 211 to slidably fit within member 215 whereby assembly and disassembly of pipe assembly 213 and pipe 211 is facilitated.

Outer pipe 214 is provided with an integral nut portion 220 adjacent its threaded portion and outwardly disposed therefrom, portion 220 serving to enable connection and disconnection of pipe 214 and collar 205 with a wrench or the like. In addition, outer pipe 214 is provided with a flange 221 at its outwardly disposed end, flange 221 being provided with a plurality of openings 222 to accommodate an equal plurality of nuts and bolts (not shown) to thereby connect flange 221 to an adjacent gasket 223 and a flange 224 which are provided with similar openings 225 and 226, respectively.

Gasket 223 is centrally apertured to receive the projecting end of inner pipe 215, and serves to provide a tight connection between flanges 221 and 224. Flange 224 forms an integral part of a pipe assembly 230 which comprises, as shown in Fig. 7, an outer pipe 231 and an inner pipe 232. Inner pipe 232 is located within pipe 231 in concentric relation therewith, the inward end of inner pipe 232 being slightly recessed within pipe 231 to thereby accommodate the projecting end of inner pipe 215. In addition, a cylinder 233 composed of insulating material, and located interjacent pipes 231 and 232, is adhesively bonded to pipes 231 and 232 to thereby reduce the temperature of the external surfaces of pipe member 230.

Pipes 231 and 232, together with cylinder 233, project outwardly of the vehicle in which the disposal device is installed, as for example, an airplane. Outside the airplane is mounted any suitable means (not shown) for drawing the exhaust gases and materials out of the disposal device, one suitable means being a venturi tube, for example. Air flowing through the venturi tube effects a reduction of pressure therewithin which serves to cause a flow of exhaust matter from the disposal device to the atmosphere. Thus, it will be evident that exhaust system 20 permits a continuous circulation of air to be provided through the disposal device, the supply air being initially drawn from the vehicle or airplane interior into the interior of upper assembly 10 through holes 36, as best illustrated in Figs. 1 and 2. From assembly 10, the air is drawn downwardly through vent members 161 of baffle assembly 14 into annular space 192 of lower receptacle 174. From this point, the air is further drawn downwardly past the ends 171 of tubes 170, with a portion of the air diverting through draft tubes 170 to be directed against waste matter which may be deposited upon the center portion 193 of pan 16. The remainder of the air continues downwardly into and through annular trough 195 of pan 16.

This air supply furnishes sufficient oxygen for combustion and incineration of the waste matter within receptacle 174, the incineration producing for the most part finely divided ash particles together with a certain amount of volatiles or gases. Finally, by virtue of the reduced pressure or pressure differential produced by the exhausting means, such as the venturi tube previously described, the ash particles and gases produced by the incineration are exhausted through exhaust assembly 20 to the outer atmosphere.

It is to be understood that means may be provided for regulating the flow of supply air where such regulation may be necessary. A certain degree of regulation may be effected, for example, by varying the diameter of openings 36 of upper assembly 10 and vent members 161 of baffle assembly 14. In addition, deodorant materials and replaceable filters (not shown) may be incorporated in exhaust system 20, if desired, to thereby reduce disagreeable odors and clogging of system 20 by tarry exhaust substances.

Figure 8:
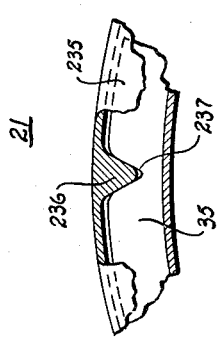
Fig. 8 is a fragmentary, sectional view, partially cut away, taken along line VIII—VIII of Fig. 2.

Assemblies 10, 14, and 11 may be fastened together by any conventional method. A preferred method of securement being through clamp assembly 21 whose construction is best illustrated in Figs. 8 and 9; which clamp assembly 21 is preferably located on the waste disposal device just above exhaust system 20.

Figure 9:
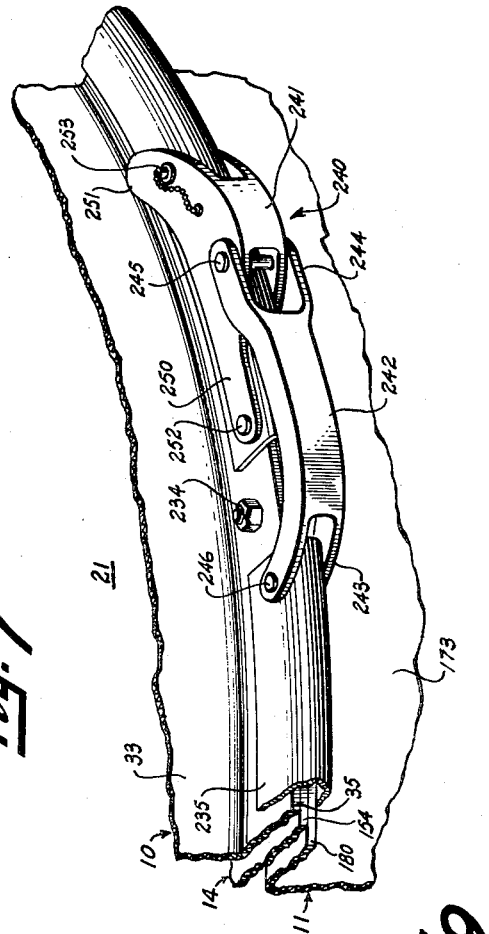
Fig. 9 is a fragmentary perspective view of the lock for the ring clamp employed in assembling the disposal device.

To insure proper alignment of assemblies 10, 14, and 11 upon assembly of the disposal device, a locating bolt 234 is disposed through suitable aligned openings provided in flange 35, of upper assembly 10, outer edge portion 154 of baffle assembly 14, and upper flange 180 of lower assembly 11, as seen in Figs. 2 and 9, bolt 234 being secured in this position by a conventional locknut and a pair of washers.

Clamp assembly 21 comprises a ring clamp 235 which is more or less C shaped in cross section and is adapted to fit snugly peripherally about the assembled edges of flange 35, portion 154 and flange 180. Clamp 235 forms a nearly complete circle, being open only in the region of bolt 234 in order to allow clearance therefor. In addition, clamp 235 is provided with an inwardly protruding wedge 236, as illustrated in Fig. 8, which is located diametrically opposite bolt 234. Wedge 236 is adapted to engage a series of vertically aligned notches 237 provided therefor in flange 35, portion 154, and flange 180 to thereby align assemblies 10, 14, and 11 and also to locate clamp 235 in proper relation with bolt 234.

The ends of clamp 235, located at the bolt 234, are urged together by a conventional past-center linkage or lever mechanism 240 which, as shown in Fig. 9, comprises, principally, a lever 241 and a connecting arm or link 242. Link 242 is generally curved through its length and is, additionally, channel shaped in cross section. Further, link 242 embodies bifurcated ends 243 and 244, end 243 being pivotally connected to adjacent end of clamp 235, and end 244 being pivotally connected to approximately the mid portion of lever 241 by a pin 245 as shown. A preferred connection between end 243 and clamp 235 is by a pair of pins 246 arranged through end 243 and clamp 235 so as to be substantially flush with the inner surface of clamp 235 whereby clamp 235 may easily fit over flanges 35 and 180.

Lever 241, like link 242, is channel shaped in cross section and generally curved through its length and is provided with a pair of bifurcated ends 250 and 251. One end 250 is pivotally connected to the end of clamp 235 adjacent thereto by a pair of pins 252, which are mounted flush with the inner surface of clamp 235 for the same reasons described in connection with pins 246. The other end 251 of lever 241 serves as a manually operable handle for locking mechanism 240, as will be described, and in its normally closed position, as illustrated in Fig. 9, end 251 fits about clamp 235 is safetied in this position by a locking pin 253 which is disposed through suitable aligned openings in end 251, clamp 235, flange 35, portion 154, and flange 180.

As will be obvious to those skilled in the art, tension forces tending to separate the ends of ring clamp 235 only serve to force end 251 inwardly to thereby more tightly maintain mechanism 240 in the normally closed position illustrated.

In its open position (not shown), clamp assembly 21 is characterized by a larger diameter than the diameters of flange 35, portion 154, and flange 180 to thereby permit location over the latter elements in assembly, the ends of ring clamp 235 then being drawn together by manipulation of end 251. End 251 is manually urged inwardly, this inward urging causing pivotal movement of end 250 about pins 252 thereby, in turn, urging end 244 inwardly and drawing the ends of clamp 235 more closely together.

Assembly 21 thus facilitates assembly and disassembly of the disposal device while simultaneously affording a positive means for maintaining the various component parts of the device in proper alignment.

Disassembly of the disposal device for cleaning and maintenance or the like is greatly facilitated by the provision of clamp assembly 21. To disassemble the disposal device, the clamp assembly 21 is first removed by release of lever mechanism 240 and then the locating bolt 234 is withdrawn. After this the entire upper assembly 10 may then be separated from lower assembly 11 by lifting it upwardly.

The removable pipe 211 of the exhaust system may then be unscrewed from collar 203 and withdrawn from pipe 215, to thereby permit the removal of baffle assembly 14 and pan 16.

In order to reduce maintenance of the disposal device to a minimum, the majority of the components are preferably fabricated of stainless steel or similar material which possesses good resistance to high temperatures and corrosive action, such as are ordinarily encountered in the incineration of the waste material. For these same reasons, the inner surface of pan 16, the inner surface of lower baffle 146, and the surfaces of tubes 170 are preferably coated with a suitable ceramic coating which, as is well known to the skilled in the art, is characterized by a relatively superior resistance to high temperatures and corrosion.

The disposal device of the present invention is thus capable of disposing of waste materials in a relatively simple, rapid, and clean manner by incinerating such waste materials and exhausting the gases and ash particles to the atmosphere whereby storage facilities for the waste and flushing liquids is substantially eliminated.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A waste incinerating device comprising a first assembly including an open ended first receptacle for receiving waste, a second assembly including a second receptacle and means therein for incinerating the waste, said second receptacle having an open end adjacent an open end of said first receptacle, a baffle assembly positioned between said first and second assemblies, said baffle assembly having a central opening aligned with the adjacent openings in said first and second receptacles, said baffle assembly additionally having a plurality of openings for the passage of air to said second receptacle, means for directing the air to the waste to be incinerated, closure means arranged for normally closing said adjacent open ends of said first and second receptacles, actuable means for operating said closure means to open position whereby the waste passes from said first receptacle to said second receptacle, and means for exhausting products of incineration from said second receptacle.

2. A waste disposal device adapted for incineration of waste, said device comprising a first assembly including a deposit receptacle for receiving waste, said deposit receptacle having an inlet opening and outlet opening, a second assembly including an insulated incineration receptacle having an opening adjacent said outlet opening of said deposit receptacle and electrical heating means within said incineration receptacle for incinerating the waste, a partition member positioned between said first and second assemblies, said partition member having a central opening aligned with said adjacent openings in said deposit and incineration receptacles, said partition member having vents therethrough for the passage of air from said first assembly to said incineration receptacle, movable closure means arranged for normally closing said adjacent openings of said deposit and incineration receptacles, actuable means for moving said closure means to an open position whereby the waste passes from said deposit receptacle to said incineration receptacle, baffle means supported within said incineration receptacle for routing air against the waste in said incineration receptacle, and exhaust means for exhausting incinerated waste products from said incineration receptacle.

3. A waste disposal device adapted for incineration of waste, said device comprising a first assembly including a deposit receptacle for receiving waste, said deposit receptacle having an inlet opening and an outlet opening and further having a plurality of openings for the entrance of supply air, a second assembly including an insulated incineration receptacle having an opening adjacent said outlet opening of said deposit receptacle and electrical heating means within said incineration receptacle for incinerating the waste, a baffle assembly including a plate positioned between said first and second assemblies, said plate having a plurality of openings for permitting the supply air to pass from said first assembly to said incineration receptacle, said plate further having a central opening aligned with the adjacent openings in said deposit and incineration receptacles, a plurality of movable doors operatively mounted on said deposit receptacle for normally closing said adjacent openings of said deposit and incineration receptacles, actuable means for moving said plurality of doors to an open position whereby the waste passes from said deposit receptacle to said incineration receptacle, baffle means carried by said plate for routing air against the waste in said incineration receptacle, and exhaust means associated with said incineration receptacles for exhausting incinerated waste products therefrom.

4. A waste disposal device adapted for incineration of waste, said device comprising a first assembly including a deposit receptacle for receiving waste, said deposit receptacle having an inlet opening and an outlet opening, a second assembly including an insulated incineration receptacle having an opening adjacent said outlet opening of said deposit receptacle and electrical heating means within said incineration receptacle for incinerating the waste, an insulated partition member positioned between said first and second assemblies having a central opening aligned with the adjacent openings in said deposit and incineration receptacles and having vent means therethrough for the passage of air into said incineration receptacle, movable first and second pairs of doors pivotally mounted on said deposit receptacle for normally closing said adjacent openings of said deposit and incineration receptacles, actuable means for simultaneously moving said first and second pairs of doors to an open position whereby the waste passes from said deposit receptacle to said incineration receptacle, baffle members supported by said partition member for routing supply air against the waste in said incineration receptacle, and exhaust means associated with said incineration receptacle for exhausting incinerated waste products therefrom.

5. A waste disposal device adapted for incineration of waste, said device comprising a first assembly including a deposit receptacle for receiving waste, said deposit receptacle having an inlet opening and an outlet opening, a second assembly including an insulated incineration receptacle having an inlet opening adjacent said outlet opening of said deposit receptacle, electrical heating means within said incineration receptacle for incinerating the waste, a baffle assembly including a plate positioned between said first and second assemblies, said plate having a central opening aligned with the adjacent openings in said deposit and incineration receptacles, a first pair of doors pivotally carried by said deposit receptacle for closing the outlet opening of said deposit receptacle, a second pair of doors also pivotally carried by said deposit receptacle for normally closing the inlet opening of said incineration receptacle, said second pair of doors including means for releasably maintaining said first pair of doors in their normally closed position when said second pair of doors are in closed position, actuable means for moving said second pair of doors to open position for removing restraint from said first pair of doors whereby said first pair of doors simultaneously moves with said second pair of doors to open position to permit the passage of the waste from said deposit receptacle to said incineration receptacle, means providing for the passage of air to said incineration receptacle, air directing means for routing air against the waste in said incineration receptacle, and exhaust means associated with said incineration receptacle for exhausting incinerated waste products therefrom.

6. A waste disposal device adapted for incineration of waste, said device comprising a first assembly including a deposit receptacle for receiving waste, said deposit receptacle having an inlet opening and an outlet opening, a second assembly including an insulated incineration receptacle having an inlet opening adjacent said outlet opening of said deposit receptacle and heating means within said incineration receptacle for incinerating the waste, a baffle assembly including a plate positioned between said first and second assemblies, said plate having a central opening aligned with the adjacent openings in said deposit and incineration receptacles and having vent means for the passage of air to said incineration receptacle, a first pair of doors pivotally carried by said deposit receptacle for closing the outlet opening of said deposit receptacle, a second pair of doors also pivotally carried by said deposit receptacle for normally closing the inlet opening of said incineration receptacle, said second pair of doors having means thereon for releasably maintaining said first pair of doors in their normally closed position when said second pair of doors are in their closed position, an operable treadle member, linkage means operatively connecting said treadle member to said second pair of doors whereby said treadle member may effect movement of said first and second pairs of doors simultaneously to an open position whereby the waste passes from said deposit receptacle to said incineration receptacle, baffle means secured to said plate of said baffle assembly for routing air against the waste in said incineration receptacle, and exhaust means associated with said incineration receptacle for exhausting incinerated waste products therefrom.

7. A waste disposal device adapted for incineration of waste, said device comprising a first assembly including a deposit receptacle for receiving waste, said deposit receptacle having an inlet opening and an outlet opening, a second assembly including an insulated incineration receptacle having an inlet opening adjacent said outlet opening of said deposit receptacle and heating means within said incineration receptacle for incinerating the waste, a removable pan positioned within said incineration receptacle between said inlet opening and said heating means of said incineration receptacle, a baffle assembly including a plate positioned between said first and second assemblies, said plate having a central opening aligned with the adjacent openings in said deposit and incineration receptacles and having vent means for the passage of air to said incineration receptacle, a first pair of doors pivotally carried by said deposit receptacle for closing the outlet opening of said deposit receptacle, a second pair of doors pivotally carried by said deposit receptacle for normally closing the inlet opening of said incineration receptacle, said second pair of doors having means thereon for releasably maintaining said first pair of doors in their normally closed position when said second pair of doors are in closed position, an operable treadle member, spring biased linkage means operatively connecting said treadle member to said second pair of doors for maintaining said first and second pair of doors in their normally closed position and for moving said first and second pairs of doors to an open position whereby the waste passes from said deposit receptacle into said pan, baffle means secured to said plate of said baffle assembly for routing air against the waste in said pan, and exhaust means associated with said incineration receptacle for exhausting incinerated waste products therefrom.

8. A waste disposal device adapted for incineration of waste, said device comprising a first assembly including a deposit receptacle for receiving waste, said deposit receptacle having an inlet opening and an outlet opening and said first assembly having a plurality of openings for the entrance of supply air, a second assembly including an insulated incineration receptacle having an inlet opening adjacent said outlet opening of said deposit receptacle and heating means within said incineration receptacle for incinerating the waste, a removable pan positioned within said incineration receptacle between said inlet opening and said heating means of said incineration receptacle, a baffle assembly including a plate positioned between said first and second assemblies, said plate having a plurality of openings for permitting air to enter said incineration receptacle, said plate further having a central opening aligned with the adjacent openings in said deposit and incineration receptacles, a first pair of doors pivotally carried by said deposit receptacle for closing the outlet opening of said deposit receptacle, a second pair of doors pivotally carried by said deposit receptacle for normally closing the inlet opening of said incineration receptacle, said second pair of doors having means thereon for releasably maintaining said first pair of doors in their normally closed position when said second pair of doors are in closed position, an operable treadle member, spring biased linkage means operatively connecting said treadle member to said second pair of doors for maintaining said first and second pairs of doors in their normally closed position and for moving said first and second pairs of doors to an open position whereby the waste passes from said deposit receptacle into said pan, baffle means secured to said plate of said baffle assembly for routing air against the waste in said pan, and exhaust means associated with said incineration receptacle for exhausting incinerated waste products therefrom.

9. A waste disposal device adapted for incineration of waste, said device comprising a first assembly including a deposit receptacle for receiving waste, said deposit receptacle having an inlet opening and an outlet opening and said first assembly having a plurality of openings for the entrance of supply air, said second assembly including an insulated incineration receptacle having an inlet opening adjacent said outlet opening of said deposit receptacle and heating means within said incineration receptacle for incinerating the waste, a removable pan positioned within said incineration receptacle between said inlet opening and said heating means of said incineration receptacle, a baffle assembly including a plate positioned between and secured to said first and second assemblies, said plate having a plurality of openings for permitting air to enter said incineration receptacle, said plate further having a central opening aligned with the adjacent openings in said deposit and incineration receptacles, a first pair of doors pivotally carried by said deposit receptacle for closing the outlet opening of said deposit receptacle, a second pair of doors pivotally carried by said deposit receptacle for normally closing the inlet opening of said incineration receptacle, said second pair of doors including means for relasably mainting said first pair of doors in their normally closed position when said second pair of doors are in closed position, an operable treadle member, spring biased linkage means operatively connecting said treadle member to said second pair of doors for maintaining said first and second pairs of doors in their normally closed position and for moving said first and second pairs of doors to an open position whereby the waste passes from said deposit receptacle into said pan, baffle means secured to said plate of said baffle assembly for routing air against the waste in said pan, and exhaust means associated with said incineration receptacle for exhausting incinerated waste products therefrom.

10. An aircraft waste disposal device adapted for incineration of toilet waste, said device comprising a first assembly including a deposit receptacle for receiving waste, said deposit receptacle having an inlet and an outlet opening and said first assembly having a plurality of openings for the entrance of supply air, said second assembly including an insulated incineration receptacle having an inlet opening adjacent said outlet opening of said deposit receptacle and electrical heating means within said incineration receptacle for incinerating the waste, a removable pan positioned within said incineration receptacle between said inlet opening and said electrical heating means of said incineration receptacle, a baffle assembly including a plate positioned between said first and second assemblies, said plate having a plurality of openings for permitting air to enter said incineration receptacle, said plate further having a central opening aligned with the adjacent openings in said deposit and incineration receptacles, clamp means for readily detachably securing together said first, second, and baffle assemblies, said clamp means including a past-center linkage for urging said clamp means to a closed position, a first pair of doors pivotally carried by said deposit receptacle for closing the outlet opening of said deposit receptacle, a second pair of doors pivotally carried by said deposit receptacle for normally closing the inlet opening of said incineration receptacle, said second pair of doors having means thereon for releasably maintaining said first pair of doors in their normally closed position when said second pair of doors are in closed position, an operable treadle member, spring biased linkage means operatively coupling said treadle member to said second pair of doors for maintaining said first and second pairs of doors in their normally closed position and for moving said first and second pairs of doors to an open position whereby the waste passes from said deposit receptacle into said pan, baffle means secured to said plate of said baffle assembly for routing air against the waste in said pan, and means associated with said incineration receptacle for exhausting products of the incineration from said incineration receptacle to the outside of the aircraft.

11. A waste incinerating device comprising a first receptacle for receiving waste, said first receptacle having an inlet opening and an outlet opening, a second receptacle having an opening communicating with said outlet opening of said first receptacle, means within said second receptacle for incinerating waste, a first door means adapted for normally closing said outlet opening of said first receptacle whereby waste may be accepted within said first receptacle, a second door means arranged in the plane of and normally biased to sealing relation with said opening of said second receptacle, actuable means for moving both said first door means and said second door means to an open position whereby the waste passes from a position in said first receptacle to said second receptacle, and exhaust means associated with said second receptacle for ejecting incinerated waste products therefrom.

12. A waste incinerating device comprising an upright open ended first receptacle for receiving waste, an insulated second receptacle having an open end aligned with and located below the lower end of said first receptacle, means within said second receptacle for incinerating the waste, a first door means adapted for normally closing said lower end of said first receptacle whereby waste may be accepted within said first receptacle, a second door means arranged in the plane of and normally biased to sealing relation with said open end of said second receptacle, actuable means having an operative connection with said first door means and said second door means for movement of both to an open position to permit the passage of waste from its position in said first receptacle to said second receptacle, and exhaust means associated with said second receptacle for ejecting incinerated waste products therefrom.

13. A disposal device for incinerating waste, said device comprising a truncated first receptacle for receiving waste, said first receptacle having an inlet opening and an outlet opening, a second receptacle having an opening adjacent and in alignment with said outlet opening of said first receptacle, electrical heating means within said second receptacle for incinerating the waste, a first pair of doors forming a continuation of said first receptacle thereby serving to normally close said outlet opening of said first receptacle whereby waste may be accepted within said first receptacle, a second pair of doors arranged in the plane of and normally biased to sealing relation with said opening of said second receptacle, manually actuable means for simultaneously moving both said first pair of doors and said second pair of doors to an open psition to permit the passage of waste from its position in said first receptacle to said second receptacle, and means for exhausting products of incineration from said second receptacle to atmosphere exterior of the vehicle.

14. A waste disposal device comprising an upper receptacle shaped in the form of a truncated cone for receiving waste and adapted to receive a disposable conical liner, said upper receptacle having an inlet opening and an outlet opening, an insulated lower receptacle having an opening adjacent said outlet opening of said upper receptacle, electrical heating means within said lower receptacle for calcining the waste, a first pair of doors pivotally carried by said upper receptacle and forming a continuation of said upper receptacle thereby serving to normally close said outlet opening of said upper receptacle whereby waste may be received in said disposable conical liner in said upper receptacle, a second pair of doors arranged in the plane of and normally biased to sealing relation with said opening of said lower receptacle, actuable means including means operatively interconnecting said first and second pairs of doors for simultaneously moving both said first and second pairs of doors to an open position whereby said disposable conical liner passes from said upper receptacle through both said first and second pairs of doors and into said lower receptacle, and exhaust means associated with said lower receptacle for ejecting incinerated waste products therefrom.

15. A waste incinerating device comprising a first receptacle for receiving waste, said first receptacle having an inlet opening and an outlet opening, an insulated second receptacle having an opening adjacent said outlet opening of said first receptacle, means within said second receptacle for incinerating the waste, a first door means adapted for normally closing said outlet opening of said first receptacle whereby waste may be accepted within said first receptacle, a second door means arranged in the plane of and biased for normal sealing relation with said open end of said second receptacle, a manually operable treadle member, means, including linkage means and a spring, operatively connecting said treadle member to said first door means and said second door means for maintaining said first door means and said second door means in normally closed position and for moving both said first door means and said second door means to an open position when said treadle member is operated whereby the waste passes from its position in said first receptacle to said second receptacle, and exhaust means associated with said second receptacle for ejecting incinerated waste products therefrom.

16. A toilet waste incinerating device comprising a truncated upper receptacle for receiving waste and adapted to receive a disposable conical liner, said upper receptacle having an inlet and an outlet opening, an insulated lower receptacle having an opening adjacent said outlet opening of said upper receptacle, said lower receptacle having heating means therein for incinerating the waste, a first pair of doors forming a continuation of said upper receptacle thereby serving to normally close said outlet opening of said upper receptacle whereby waste may be accepted in said conical liner, a second pair of doors arranged in the plane of and normally biased to sealing relation with said opening of said lower receptacle, actuable means for pivoting said first pair of doors and said second pair of doors to an open position whereby the waste in said conical liner falls from said upper receptacle to said lower receptacle, and means for supplying air to said lower receptacle, said last named means including exhaust means operatively associated with said lower receptacle, said exhaust means serving additionally for exhausting incinerated waste products from said lower receptacle.

17. A waste disposal device adapted for incineration of toilet waste, said device comprising a deposit receptacle shaped in the form of a truncated cone for receiving waste and adapted to receive a disposable conical liner, said deposit receptacle having an inlet opening and an outlet opening, an insulated incineration receptacle having an opening adjacent said outlet opening of said deposit receptacle, said incineration receptacle having electrical heating means therein for incinerating the waste, a first pair of doors pivotally carried by said deposit receptacle and forming a continuation of said deposit receptacle thereby serving to normally close said outlet opening of said deposit receptacle whereby waste may be received in said disposable conical liner in said deposit receptacle, a second pair of doors arranged in the plane of and normally biased to sealing relation with said opening of said incineration receptacle, actuable means for moving said first pair of doors and said second pair of doors to an open position whereby the waste passes from said deposit receptacle to said incineration receptacle, means affording passage for air into said incineration receptacle, air directing means for routing a portion of the air entering the incineration receptacle generally directly over the waste in said incineration receptacle, and exhaust means operatively associated with said lower receptacle for exhausting incinerated waste products from said lower receptacle.

References Cited in the file of this patent

UNITED STATES PATENTS

| | | |
|---|---|---|
| 621,790 | Burger | Mar. 29, 1899 |
| 783,474 | Smith | Feb. 28, 1905 |
| 862,000 | Meen | July 30, 1907 |
| 1,052,315 | Chickaneff | Feb. 4, 1913 |
| 1,092,080 | Schellhammer | Mar. 31, 1914 |
| 1,131,188 | Weaver | Mar. 9, 1915 |
| 1,272,483 | McGary et al. | July 16, 1918 |
| 1,290,615 | McGary | Jan. 7, 1919 |
| 1,293,141 | McGary | Feb. 4, 1919 |
| 1,432,740 | LeBlanc | Oct. 24, 1922 |
| 1,527,252 | Rohn | Feb. 24, 1925 |
| 1,643,206 | Epstein | Sept. 20, 1927 |
| 1,818,586 | Schumacher | Aug. 11, 1931 |
| 1,938,013 | Folsom | Dec. 5, 1933 |
| 2,376,938 | Potter | May 29, 1945 |
| 2,488,405 | Hebert | Nov. 15, 1949 |
| 2,559,228 | Riesbschlager | July 3, 1951 |
| 2,653,213 | Comstock | Sept. 22, 1953 |

FOREIGN PATENTS

| | | |
|---|---|---|
| 162,597 | Great Britain | May 5, 1921 |